United States Patent
Ethier et al.

(10) Patent No.: US 7,843,842 B2
(45) Date of Patent: *Nov. 30, 2010

(54) METHOD AND SYSTEM FOR INITIATING A REMOTE TRACE ROUTE

(75) Inventors: Randall P. J. Ethier, Burke, VA (US); Rajesh Kumar, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 11/462,587

(22) Filed: Aug. 4, 2006

(65) Prior Publication Data

US 2008/0031145 A1    Feb. 7, 2008

(51) Int. Cl.
*G01R 31/08* (2006.01)

(52) U.S. Cl. ............ 370/248; 370/252; 379/32.01

(58) Field of Classification Search ........ 370/252, 370/241, 216; 455/24; 379/32.01
See application file for complete search history.

(56) References Cited

U.S. PATENT DOCUMENTS

| | | | |
|---|---|---|---|
| 5,809,121 A | 9/1998 | Elliott et al. | |
| 6,295,353 B1 | 9/2001 | Flockhart et al. | |
| 6,335,927 B1 | 1/2002 | Elliott et al. | |
| 6,359,976 B1 | 3/2002 | Kalyanpur et al. | |
| 6,373,932 B2 | 4/2002 | Bakshi et al. | |
| 6,456,845 B1 | 9/2002 | Drum et al. | |
| 6,654,602 B1 | 11/2003 | Fye et al. | |
| 6,681,232 B1 | 1/2004 | Sistanizadeh et al. | |
| 6,801,940 B1 | 10/2004 | Moran et al. | |
| 6,975,876 B1 | 12/2005 | Cast et al. | |
| 6,985,901 B1 | 1/2006 | Sachse et al. | |
| 7,028,228 B1 | 4/2006 | Lovy et al. | |
| 7,043,237 B2 | 5/2006 | Snyder et al. | |
| 7,051,098 B2 | 5/2006 | Masters et al. | |
| 7,072,291 B1 * | 7/2006 | Jagadeesan et al. | 370/216 |
| 2005/0276386 A1 | 12/2005 | Ethier et al. | |
| 2005/0276387 A1 | 12/2005 | Ethier et al. | |
| 2005/0276388 A1 | 12/2005 | Ethier et al. | |
| 2006/0073786 A1 * | 4/2006 | Sarkar | 455/24 |
| 2006/0126528 A1 * | 6/2006 | Ramalho | 370/252 |
| 2006/0153089 A1 | 7/2006 | Silverman | |
| 2006/0164999 A1 | 7/2006 | Yamamoto et al. | |
| 2007/0286351 A1 * | 12/2007 | Ethier et al. | 379/32.01 |

OTHER PUBLICATIONS

Friedman et al, RTP Control Protocol Extended Reports (RTCP XR), Nov. 2003, IEFC RFC 3611, pp. 2-3.*

(Continued)

*Primary Examiner*—Jason E Mattis
*Assistant Examiner*—Joey Bednash
(74) *Attorney, Agent, or Firm*—Baker Botts L.L.P.

(57) ABSTRACT

A method for initiating a remote trace route includes establishing a communication session between a first endpoint and a second endpoint. The method also includes detecting at the first endpoint a quality impairment in a communication sent from the second endpoint. In response to detecting the quality impairment, the method includes sending a request from the first endpoint to the second endpoint for the second endpoint to initiate a trace route from the second endpoint to the first endpoint. Upon receiving the request at the second endpoint, the method includes initiating a trace route from the second endpoint to the first endpoint.

31 Claims, 2 Drawing Sheets

OTHER PUBLICATIONS

Clark et al, RTCP HR—High Resolution VoIP Metrics Report Blocks, Jun. 2006, IEFC RFC Draft.*

SNMP Commands, http://cisco.com/univercd/cc/td/doc/product/mels/15530/command/hcr_snmp.htm, pp. 1-11, printed Apr. 19, 2006.

S. Chisholm et al., Network Working Group, "Alarm Management Information Base (MIB)," http://www.ietf.org/rfc./rfc3877.txt?number=3877, pp. 1-71, 2004.

"3rd Generation Partnership Project; Technical Specification Group Services and System Aspects; Subscriber and Equipment Trace (Release 5)," 3GPP TS 32.108 V0.0.1, *European Telecommunications Standards Institute*, Oct. 2001, 44 pages.

"Digital cellular telecommunications system (Phase 2+); Telecommunication management; GSM subscriber and equipment trace (3GPP TS 52.008 version 6.0.0 Release 6)," ETSI TS 152 008 V6.0.0, *European Telecommunications Standards Institute*, Dec. 2004, 58 pages, Dec. 2004.

Universal Mobile Telecommunications System (UMTS); Telecommunication management; Subscriber and equipment trace; Trace control and configuration management (3GPP TS 32.422 version 6.3.0 Release 6), ETSI TS 132 422, European Telecommunications Standards Institute, Jun. 2005, 42 pages.

"Universal Mobile Telecommunications System (UMTS); Telecommunication management; Subscriber and equipment trace; Trace data definition and management (3GPP TS 32.423 version 6.2.0 Release 6)," ETSI TS 132 423 V6.2.0, European Telecommunications Standards Institute, Jun. 2005, 38 pages.

"Universal Mobile Telecommunications System (UMTS); Telecommunication management; Subscriber and equipment trace; Trace concepts and requirements (3GPP TS 32.421 version 6.7.0 Release 6)," ETSI TS 132 421, European Telecommunications Standards Institute, Jun. 2005, 23 pages.

Rosenberg et al., "STUN—Simple Traversal of User Datagram Protocol (UDP) Through Network Address Translators (NATs)," Network Working Group, The Internet Society, 2003, http//www.ietf.org/rfc/rfc3489.txt? number+3489, pp. 1-44, printed May 30, 2006.

White et al., "Definitions of Managed Objects for Remote Ping, Traceroute, and Lookup Operations, )," The Internet Society, 2000, Network Working Group, http//www.ietf.org/rfc/rfc2925txt, pp. 1-72, printed Aug. 4, 2006.

Andreasen et al., "A No-Op Payload Format for RTP draft-wing-avt-rtp-noop-03, )," The Internet Society, 2005, Network Working Group, http//www.faqs.org/ftp/pub/internet-drafts/draft-wing-avt-rtp-noop-03.txt, pp. 1-13, printed Jun. 1, 2006.

Kumar, Rajesh, "Vendor Tree—vnd.cisco.com," Cisco Systems, pp. 1-3, created Aug. 23, 2001, http://www.iana.org/assignments/media-types/audio/vnd.cisco.nse, printed Jun. 1, 2006.

Friedman et al., "RTP Control Protocol Extended Reports (RTCP XR),"The Internet Society, 2003, Network Working Group, http//www.networksorcery.com/enp/rfc/rfc3611.txt, pp. 1-52, printed May 30, 2006.

Schulzrinne et al., "A Transport Protocol for Real-Time Applications," The Internet Society, 2003, Network Working Group, http//www.ietf.org/rfc/rfc3550.txt, pp. 1-98, printed Aug. 4, 2006.

Oran et al., U.S. Appl. No. 10/269,895, entitled "System and Method for Distributed Diagnostics in a Communication System," filed Oct. 10, 2002, 44 pages, 062891.0743.

Cao et al., U.S. Appl. No. 10/766,245, entitled "System and Method for Distributed IP Telephony Tracking," filed Jan. 26, 2004, 50 pages, 062891.1187.

Kumar et al., U.S. Appl. No. 11/379,312, filed Apr. 19, 2006, entitled "Method and System for Alert Throttling in Media Quality Monitoring," 47 pages, 062891.1944.

Ethier et al., U.S. Appl. No. 11/462,587, filed Aug. 4, 2006, entitled "Method and System for Initiating a Remote Trace Route," 48 pages, inventors Ethier et al., filed Aug. 4, 2006, 062891.1931.

SB Petrack, VocalTec, Internet Draft, TSE Payload, Nov. 17, 1998, *RTP Payloads for Telephone Signal Events*, (12 pages).

J. Rosenberg et al., Network Working Group, Standards Track, Mar. 2003, *STUN—Simple Traversal of User Datagram Protocol (UDP) through Network Address Translators (NaTs)* (47 pages).

* cited by examiner

METHOD AND SYSTEM FOR INITIATING A REMOTE TRACE ROUTE

TECHNICAL FIELD OF THE INVENTION

This invention relates generally to communications systems and, more particularly, to a method and system for initiating a remote trace route.

BACKGROUND

As the internet continues to grow in popularity and pervasiveness so do the products and services that use it. The large number of internet users spread throughout the world and the wide variety of hardware components and software used therein presents numerous opportunities for media streams to become impaired. Such impairments may include low signal levels, high noise levels, or low mean opinion scores. The impairments may, for example, be caused by packet loss between the two endpoints, excessive traffic at any of the components between the two endpoints, endpoints out of sync with each other, or incompatible hardware or software between the two endpoints or other components. One common tool used to help assess the cause of the impairment is a trace route. A trace route may be used to determine the path used by a communication to reach a particular endpoint. Once a trace route has been initiated by an endpoint the trace route typically progresses along the same path used by communications sent from that endpoint. Endpoints typically initiate a trace route towards a remote endpoint when the endpoint receives a quality impaired communication from the remote endpoint.

However, it may be the case that communications sent from a first endpoint to a second endpoint take a different path than communications sent from the second endpoint to the first endpoint. Thus, if the first endpoint detects an impairment in a communication sent from the second endpoint and initiates a trace route, the first endpoint is not guaranteed that the path of the trace route will be the same as the path of the impaired communication.

SUMMARY

In accordance with the present invention, a method and system for initiating a remote trace route is provided which substantially eliminates or reduces the disadvantages and problems associated with previous systems and methods.

In accordance with a particular embodiment of the present invention, a method for initiating a remote trace route includes establishing a communication session between a first endpoint and a second endpoint. The method also includes detecting at the first endpoint a quality impairment in a communication sent from the second endpoint. In response to detecting the quality impairment, the method includes sending a request from the first endpoint to the second endpoint for the second endpoint to initiate a trace route from the second endpoint to the first endpoint. Upon receiving the request at the second endpoint, the method includes initiating a trace route from the second endpoint to the first endpoint.

In particular embodiments the method may include sending a real-time transport protocol (RTP) no-op packet based trace route from the first endpoint to the second endpoint. The RTP no-op packet based trace route may alert the second endpoint that the first endpoint has detected the quality impairment and request the second endpoint to initiate a trace route. In some embodiments the method may further include setting a request early feedback flag in the RTP no-op packet based trace route.

In some embodiments the method may include sending a named signaling event (NSE) message from the first endpoint to the second endpoint. The NSE message alerts the second endpoint that the first endpoint has detected the quality impairment and requests the second endpoint to initiate a trace route. The NSE message may include a value in an event number field of the NSE message. The value is assigned to indicate that the first endpoint has detected the quality impairment in the communication sent from the second endpoint.

In particular embodiments the method may include initiating a simple traversal of user datagram protocol (UDP) through network address translators (NATs) (STUN) trace route from the first endpoint to the second endpoint. The STUN trace route may alert the second endpoint that the first endpoint has detected the quality impairment and request the second endpoint to initiate a trace route. The method may include sending a binding request from the first endpoint to the second endpoint. The binding request may alert the second endpoint that the first endpoint has detected a quality impairment and request the second endpoint to initiate a trace route.

In accordance with another embodiment of the present invention, a system for initiating a remote trace route includes at least two processors operable to establish a communication session between a first endpoint and a second endpoint. A first processor of the at least two processors is also operable to detect at the first endpoint a quality impairment in a communication sent from the second endpoint. In response to detecting the quality impairment, the system includes an interface coupled to the first processor and operable to send a request from the first endpoint to the second endpoint for the second endpoint to initiate a trace route from the second endpoint to the first endpoint. Upon receiving the request at the second endpoint, a second processor of the at least two processors is further operable to initiate a trace route from the second endpoint to the first endpoint.

In accordance with yet another embodiment of the present invention, a method for initiating a remote trace route includes establishing a communication session with a first endpoint. The method also includes periodically receiving a metric report from the first endpoint. The metric report includes information about the quality of a communication sent from a second endpoint. The method also includes analyzing the metric report sent from the first endpoint to determine if the communication sent from the second endpoint was quality impaired. The method further includes initiating a trace route from the second endpoint to the first endpoint upon determining that the communication sent from the second endpoint was quality impaired.

In some embodiments the method may include establishing a communication session between a first endpoint and a second endpoint by negotiating a remote metric support reporting capability selected from the group consisting of real-time transport control protocol extended report (RTCP-XR) and real-time transport control protocol high-resolution report (RTCP-HR).

Technical advantages of particular embodiments of the present invention include providing a local endpoint with the ability to initiate a remote trace route sent by a remote endpoint upon detecting a quality impairment in a communication sent from the remote endpoint. The remote trace route may follow the media path used by communications sent from the remote endpoint to the local endpoint, as opposed to a trace route initiated locally that may follow the media path used by communications sent from the local endpoint to the remote endpoint. Accordingly, a more accurate trace route is conducted. Another technical advantage of particular embodiments of the present invention includes providing the ability for a receiving endpoint to notify the sending endpoint when a quality impairment has been received. Accordingly, the two endpoints may more efficiently initiate trace routes.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
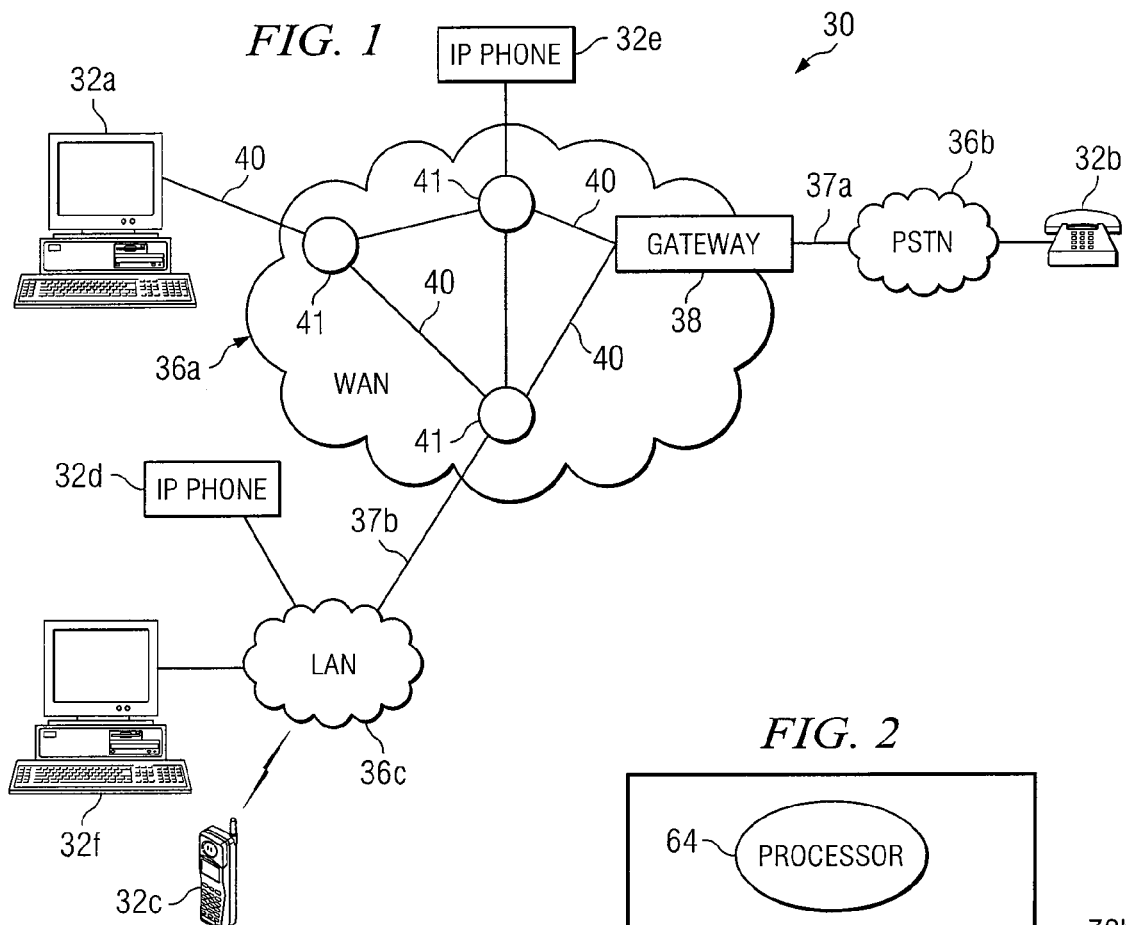
FIG. 1 illustrates a communication system including a plurality of endpoints operable to communicate among each other using internet protocol, in accordance with a particular embodiment of the present invention.

FIG. 1 illustrates a communication system 30 including a plurality of endpoints 32a-32f having the ability to establish communication sessions between each other using one or more of communication networks 36a-36c. Communication system 30 also includes gateway 38 which may allow different communication networks to transfer data. Endpoints 32a-32f may have the ability to communicate diagnostic information between each other.

During the course of a communication session between any of endpoints 32 the session may experience a quality impairment. More specifically, a communication sent by a sending endpoint may lose some of its quality as it is propagated from the sending endpoint to a receiving endpoint. This impairment may be detected by the receiving endpoint which traditionally may have caused the receiving endpoint to initiate a trace route. Unfortunately, the path used to propagate the communication from the sending endpoint to the receiving endpoint may be different than the path used to propagate communications from the receiving endpoint to the sending endpoint (a trace route usually propagates along the same path used by a communication). Thus, in particular embodiments of the present invention when the receiving endpoint detects an impairment in a communication sent from the sending endpoint it may, through a variety of different procedures discussed in more detail below, alert the sending endpoint that it should initiate a trace route towards the receiving endpoint (in the case of a non-IP endpoint, such as endpoint 32b, the sending endpoint may be an intermediary component, such as gateway 38, which converts the non-IP communication into an IP communication). This trace route may provide useful information because it may be based on a trace route that may have followed the same path that caused the quality impairment.

Calls shall include the sending or receiving of any type of media transmitted using any audio and/or video means, including signals, data or messages transmitted through any suitable technology, such as voice devices, text chat, web sessions, facsimile, on-line gaming, instant messaging and e-mail. Furthermore, a call may be used interchangeably with a communication session.

In the illustrated embodiment, communication network 36a is a wide area network (WAN) that enables calls and communications (e.g. signaling) between a plurality of endpoints 32a-32f. The WAN can be distributed across multiple cities and geographic regions, and may be referred to as a metropolitan WAN or MAN. Communication network 36b is a public switched telephone network (PSTN) and couples endpoint 32b with communication network 36a through gateway 38. Communication network 36c is a LAN, which couples endpoints 32c, 32d, and 32f with communication network 36a. Accordingly, users of endpoints 32a-32f, may establish calls between and among each network component coupled for communication with one or more of networks 36a-36c. Communication links 37a and 37b couple communication networks 36a and 36b, and communication networks 36a and 36c, respectively. Communication links 37a and 37b may include a single line (e.g., a T1 line) or they may include one or more additional networks (e.g, a WAN).

In the illustrated embodiment, communication system 30 may facilitate one or more different types of calls. For example, communication system 30 may facilitate a voice over internet protocol (VoIP) call between endpoints 32a and 32c, a video over IP call between endpoints 32a and 32f, an on-line gaming service, or any other functionality provided via a communication system.

Communication network 36a includes a plurality of segments 40 and nodes 41 that couple endpoints 32a and 32e with gateway 38 and communication networks 36b-36c. Therefore, a user of endpoint 32a is provided with access to endpoints 32b-32f. Furthermore, endpoints 32a-32f, may communicate control and data signals among each other. Nodes 41 may include any combination of network components, session border controllers, gatekeepers, call managers, conference bridges, routers, hubs, switches, gateways, endpoints, edgepoints, or any other hardware, software, or embedded logic implementing any number of communication protocols that allow for the exchange of packets in communication system 30.

Communication system 30 may also include a plurality of edgepoints. An edgepoint may be a real-time transport protocol (RTP) media relay point that may be incorporated within one or more of the devices or components depicted in FIG. 1. For example, if nodes 41 were IP to IP gateways, then any of nodes 41 may include an edgepoint. An edgepoint may also be included in any other network component or device that may, in effect, define a boundary for a particular network, such as network 36a. Some other possible devices that may incorporate an edgepoint include a session border controller and a policy execution point. The use of an edgepoint may aid a network administrator in ascertaining the contribution of his network to any impairment a call may experience.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32f. Communication network 36a may include any number and combination of segments 40, nodes 41 or endpoints 32a-32f.

In particular embodiments, communication network 36a employs voice communication protocols that allow for the addressing or identification of endpoints and/or nodes coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets are included within the scope of the present invention.

Network 36a may be directly coupled to other IP networks including, but not limited to, another LAN or WAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks. Furthermore, it may be that the endpoints do not propagate messages or communications along the same path as each other.

Technology that allows telecommunications to be transmitted over an IP network may comprise Voice over IP (VoIP), or simply Voice over Packet (VoP). In the illustrated embodiment, endpoints 32a and 32c-32f, and gateway 38 may include IP telephony capabilities allowing them to participate in and/or monitor audio, video, and other multimedia communication sessions. IP telephony devices have the ability to encapsulate a user's voice (or other input) into IP packets so that the voice can be transmitted over network 36a. IP telephony devices may include telephones, fax machines, computers running telephony software, nodes, gateways, wired or wireless devices, hand held PDAs, or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32f and/or gateway 38 may be any combination of hardware, software, and/or encoded logic that provides communication services to a user. For example, endpoints 32a-32f may include a telephone, a computer running telephony software, a video monitor, a camera, an IP phone, a cell phone or any other communication hardware, software and/or encoded logic that supports the communication of packets of media (or frames) using communication network 36a. Endpoints 32a-32f may also include unattended or automated systems, gateways, other intermediate components or other devices that can establish calls. Although FIG. 1 illustrates a particular number and configuration of endpoints, segments, nodes, and gateways, communication system 30 contemplates any number or arrangement of such components for communicating media. In addition, elements of communication system 30 may include components centrally located (local) with respect to one another or distributed throughout communication system 30.

Figure 2:
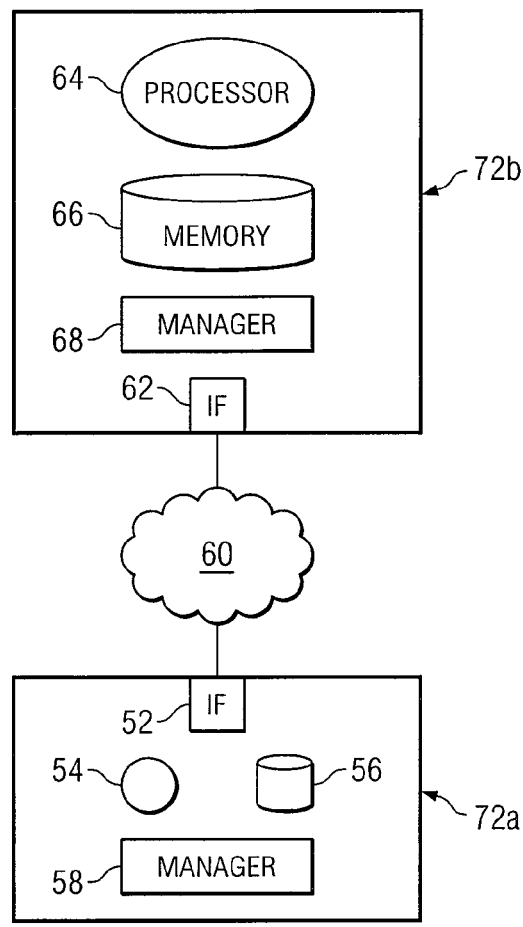
FIG. 2 illustrates a block diagram of two endpoints coupled to a communication system, in accordance with a particular embodiment of the present invention.

FIG. 2 illustrates a block diagram of two endpoints coupled to a communication system. The depicted embodiment includes endpoints 72a and 72b. Endpoints 72a and 72b may be any endpoints that support IP telephony, such as IP phones or computers running telephony software enabling them to communicate using, for example, VoIP technology. Endpoint 72a may include interface 52, processor 54, memory module 56, and manager 58. Similarly, endpoint 72b may include interface 62, processor 64, memory module 66, and manager 68.

Network 60 may be similar to and may be comprised of any of networks 36 from FIG. 1. Network 60 couples endpoint 72a to endpoint 72b, as well as any other endpoints or components that may be coupled to network 60. This allows any of the endpoints coupled to network 60 to communicate (either data or control signals) with one another. Network 60 may comprise more than one network. Furthermore, network 60 may comprise several different components including, but not limited to, routers, hubs, switches, edgepoints, media gateways, media servers, and other communication components. The media gateways may couple different types of networks so that data may be transferred between networks using different protocols. For example, a gateway may couple a PSTN network to an IP network.

Interfaces 52 and 62 couple endpoints 72a and 72b with communication network 60 and may be operable to send and receive communications, metric reports and/or control signals to and from endpoints 72a, 72b and/or any other components coupled to communication network 60 (e.g., a gateway).

Processors 54 and 64 may be microprocessors, controllers, or any other suitable computing devices, resources, or combination of hardware, software and/or encoded logic. Processors 54 and 64 do not need to be the same type of device, for example, processor 54 may be a microprocessor and processor 64 may be a microcontroller. Processors 54 and 64 may execute various responses according to their analysis of the quality of a call or upon receipt of a particular message from another endpoint, as described herein with respect to particular embodiments.

Memory modules 56 and 66 may be any form of volatile or non-volatile memory including, without limitation, magnetic media, optical media, random access memory (RAM), read-only memory (ROM), removable media, or any other suitable local or remote memory component. Memory modules 56 and 66 may store any suitable information to implement features of various embodiments, such as the parameters of particular media metrics. More specifically, memory modules 56 and 66 may store parameters for any of the following exemplary metrics: packet loss metric, blockiness metric, delay metric, blurriness metric, jerkiness metric, jitter metric, echo metric, signal level metric, frame freeze event metric, frame skip event metric, temporal complexity metric, spatial complexity metric, noise level metric, mean opinion score metric, concealed seconds metric, and severely concealed seconds metric.

Managers 58 and 68 may maintain a listing, table, database or any other desired organization of information about endpoints 72 or calls facilitated by communication network 60 and/or any metrics associated therewith. More specifically, the information may include which metrics are currently active, where various metric reports are being sent and what is being done with the metric reports. Manager 58 may comprise any combination of hardware, software, and/or encoded logic.

Endpoints 72a and 72b may be similar to one or more of the IP endpoints (e.g., endpoints 32a and 32c-32f) described above with respect to FIG. 1. In some embodiments, one or both of endpoints 72 may be a non-IP endpoint, such as PSTN 32b of FIG. 1. In such a case there may be an intermediary component, such as gateway 38 of FIG. 1, that may comprise features and functions similar to the features and functions of an IP endpoint. As mentioned above, remote trace routes may be triggered by receiving a request from a local endpoint alerting the remote endpoint that the local endpoint has received a quality impacted communication. Monitoring the media quality of a call to detect quality impairments, as described herein, may be performed by an endpoint capable of monitoring the media quality such as IP phones or PCs.

As indicated above, one way that the quality of a call may be monitored is through the use of metrics. Metrics may be used in monitoring any of a number of different aspects of a call, such as the media quality of the call, the amount and/or frequency of packet loss during the call, the signal level and/or noise level of the call or any other aspect of the call that may be deemed important. It should be noted that it is not intended that the present invention be limited in any way to only the use of those metrics set forth herein, rather the present invention contemplates the use of any suitable metric for measuring or assessing the quality of a call. As discussed above, a call may be quality-impacted if a characteristic monitored by a metric exceeds a predetermined threshold.

Depending on how two endpoints establish a call between them, different procedures may be used to cause the remote endpoint to initiate a trace route back to the local endpoint. This reflects the fact that different protocols have associated with them different messages and different features. Thus, the following four scenarios are presented in order to help illustrate some of the procedures that may be used in some of the possible protocols. In each of these examples one of the endpoints will be referred to as a local endpoint and the other endpoint will be referred to as a remote endpoint. This nomenclature is used to simplify the explanation; the remote endpoint could just as easily be the local endpoint, and vice-versa.

As mentioned before, in some instances, the path used in sending communications from endpoint 72a to 72b is different than the path used in sending communications from endpoint 72b to endpoint 72a. Thus, if endpoint 72a were to initiate a trace route along the path from endpoint 72a to endpoint 72b the trace route may not pass through the device or area (e.g., the network component, node, segment, session border controller, gatekeeper, call manager, conference bridge, router, hub, switch, gateway, endpoint, edgepoint, or any other hardware, software, or embedded logic that allows for the exchange of packets within a communication system) that caused the impairment in the communication from endpoint 72b. By having endpoint 72b initiate the trace route towards endpoint 72a based on the quality of communications received by endpoint 72a, it is possible to create a more accurate picture of the path being used and the source of the impairment.

In the first scenario assume that endpoints 72a and 72b have begun a communication session in which they have agreed to use a particular type of remote metric support reports, such as sender reports, receiver reports, real-time transport control protocol extended reports (RTCP-XR) or real-time transport control protocol high-resolution reports (RTCP-HR). This provides for both endpoints to periodically send the other endpoint a metric report detailing the quality of the communications that have been received from the other endpoint. Thus, in this first scenario, if local endpoint 72a has received a communication from remote endpoint 72b that is impaired (e.g., the communication has a low mean opinion score) the next metric report sent by local endpoint 72a may contain information that notifies remote endpoint 72b that the communication it sent had a quality impairment. The information regarding the detected impairment may be included in the metric report so that the endpoint that sent the impaired communication may itself analyze the impairment and determine the best way to respond (e.g., what type of trace route to initiate). The metric report sent as part of the negotiated remote metric support report may be sent regardless of whether an impairment was detected in a communication from endpoint 72b. Remote endpoint 72b may receive the metric report from local endpoint 72a through interface 62 and then process the metric report via some combination of processor 64 and manager 68. If remote endpoint 72b determines that the impairment detailed in the metric report sent by local endpoint 72a is below (or above) a certain threshold value it may initiate a trace route. This trace route may follow a path similar to the path used by the communications sent to local endpoint 72a.

In the second scenario one, or both, of the endpoints do not support any type of remote metric support reports or they can not otherwise agree on a common type of remote metric support reports to use. Because they did not successfully negotiate for the use of remote metric support reports, there may not be an automated way to periodically provide remote endpoint 72b with updates as to the quality of the communications received by local endpoint 72a. Thus, endpoint 72a may have to send endpoint 72b a message for the purpose of requesting a remote trace route. In this second scenario the request is sent via the use of real-time transport protocol (RTP) no-op packets (assuming RTP no-op packets have been negotiated during call establishment). When endpoint 72a receives a communication from endpoint 72b through IF 52, processor 54 may analyze the quality of the communication according to one or metrics selected by manager 58 and stored within memory 56. If an impairment is detected, endpoint 72a may initiate a trace route along the path used by communications from endpoint 72a to endpoint 72b. This trace route may be based on a RTP no-op packet in which a request early feedback flag is set. If the path to remote endpoint 72b is different than the path to local endpoint 72a, then this trace route may not itself provide particularly useful information because the trace route may not pass through the area or device that caused the impairment. However, endpoint 72b may receive the no-op trace route with the request early feedback flag set and, via some combination of processor 64 and manager 68, may interpret it to be an indication that endpoint 72a has received a communication from endpoint 72b that contained a media impairment. In response to this, endpoint 72b may initiate a trace route from endpoint 72b to endpoint 72a. Because this trace route is using the path that may have caused the impairment, it may be more likely to provide useful information, as opposed to the trace route sent by local endpoint 72a.

In the third scenario the endpoints have neither agreed to use a particular type of remote metric support reports nor negotiated the use of real-time transport protocol (RTP) no-op packets. Rather, both endpoints may understand (may be able to send and/or receive) named signaling event (NSE) messages. While the endpoints are establishing the call they may negotiate what value of the event number field of the NSE message they will use to indicate that one of the endpoints has detected a quality impairment in a communication from the other endpoint. The event number field value used may be a value that is not already assigned to a different event. For example, the endpoints may negotiate to use the value of 204 in the event number field of an NSE message, to indicate that an endpoint has detected a quality impairment in a communication from the other endpoint. Once endpoint 72a detects a quality impaired communication (via similar components and procedures as discussed above in the second scenario) it may send an NSE message to endpoint 72b with 204 in the event number field. Endpoint 72b may receive the NSE message via interface 62 and, after processing the NSE message via processor 64 and manager 68, it may determine that it should send a trace route to endpoint 72a. The trace route may follow the same path used by the communications sent from endpoint 72b to endpoint 72a.

In the fourth scenario a Simple Traversal of UDP (User Datagram Protocol) through NATs (Network Address Translators) (STUN) protocol may be used between endpoints 72a and 72b. STUN is a lightweight protocol that provides, among other things, the ability for endpoints to verify connectivity. If endpoint 72a detects a quality impaired communication from endpoint 72b it may employ some combination of processor 54 and manager 58 to determine how to notify endpoint 72b. The determination may be based on the type of impairment that is detected, the timing of when the impairment was detected, or any other factors that may be provisioned with manager 58.

One possible way that endpoint 72a may notify endpoint 72b of the impaired communication is to send endpoint 72b a binding request. If endpoint 72a sends a binding request, endpoint 72b may respond with a binding response. Both the binding request and the binding response are types of messages specified by the STUN protocol. Endpoint 72a may set a request trace route flag in the binding request that it sends to endpoint 72b. The flag acts as a request for endpoint 72b to initiate a trace route from endpoint 72b to endpoint 72a. Another possible way for local endpoint 72a to notify remote endpoint 72b may be for endpoint 72a to initiate its own trace route using a STUN trace route message with the request trace route flag set. Either way, once IF 62 of remote endpoint 72b receives the message with the request trace route flag set, it may initiate a trace route along the path towards local endpoint 72a.

Manager 58 may, in some embodiments, be used to select which procedure to use when the endpoints have negotiated the ability to implement more than one procedure for initiating a remote trace route. For example, in some embodiments the endpoints may have negotiated the use of RTCP-XR as well as STUN. In such an instance manager 58 may elect to use the binding request of the STUN protocol to alert endpoint 72b that it should initiate a trace route towards endpoint 72a rather than wait for the next RTCP-XR report to be sent. In part because of the possibility that having multiple triggers for initiating a remote trace route could cause an endpoint to send multiple trace routes (e.g., endpoint 72a may send a binding request upon detecting an impairment and then shortly thereafter endpoint 72b initiates a trace route in response to receiving a RTCP-XR report containing information concerning the same impairment), in some embodiments manager 58 may keep track of when trace routes have been sent. Then, if a trace route was recently sent out manager 58 may elect not to send another trace route. Manager 58 may also be used in determining the type of trace route to initiate. For example, the manager may use any of the following types of layer 3 trace routes: Internet Control Message Protocol (ICMP) trace route, UDP trace route, RTP trace route, STUN trace route.

It will be recognized by those of ordinary skill in the art that endpoints 72a and 72b are merely example configurations of an endpoint for triggering a remote trace route, in accordance with an embodiment of the present invention. Other endpoints may include any number of interfaces, managers, processors, memory modules, and/or other components to accomplish the functionality and features described herein. For example, although endpoint 72a is illustrated and described as including interface 52, processor 54, memory module 56, and manager 58 these components and other desired components for performing the above described functionality may be centrally located (local) with respect to one another, or distributed throughout communication network 60.

Figure 3:
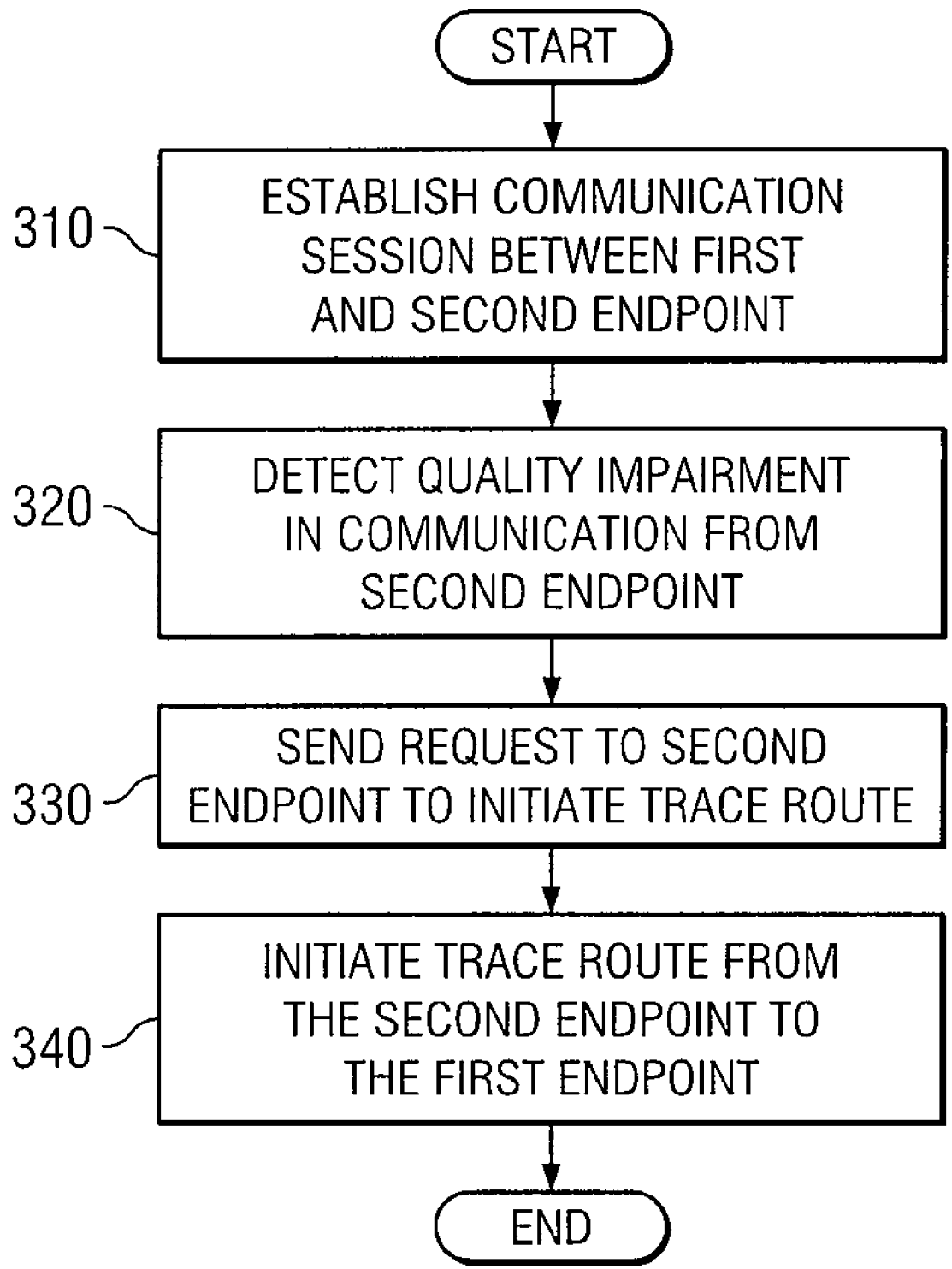
FIG. 3 illustrates a method for initiating a remote trace route, in accordance with a particular embodiment of the present invention.

FIG. 3 is a flowchart illustrating a method of initiating a remote trace route. The method begins at step 310 where a communication session between a first endpoint and a second endpoint is established. During call establishment the two endpoints may negotiate, among other things, some of the protocols and features that they will use during the communication session. The type of protocol and the features that the endpoints negotiate and use during the communication session may effect the options that are available for a local endpoint to trigger a remote trace route.

Some of the possible features and protocols that may be negotiated include: whether the endpoints will exchange remote metric support reports and if so which one (e.g., sender reports, receiver reports, RTCP-XR or RTCP-HR); whether the endpoints will use RTP no-op packets; whether the endpoints understand NSE messages, and if so, what value will be used in the event number field of an NSE message to indicate receipt of a quality impacted communication; and whether the endpoints will use the STUN protocol.

Once the communication session has been established the endpoints may begin to send communications, usually in the form of packets, between each other. The path used to send communications to the first endpoint may be different than the path used to send communications to the second endpoint. In some instances, the communication may become impaired somewhere along the path to the intended recipient of the communication. At step 320, the first endpoint detects the quality impaired communication. The impairment may be detected using a metric, such as any one or more of the following metrics: packet loss metric, blockiness metric, delay metric, blurriness metric, jerkiness metric, jitter metric, echo metric, signal level metric, frame freeze event metric, frame skip event metric, temporal complexity metric, spatial complexity metric, noise level metric, mean opinion score metric, concealed seconds metric, or severely concealed seconds metric.

At step 330, the first endpoint sends a request to the second endpoint for the second endpoint to initiate a trace route. This is particularly useful in situations in which communications from the first endpoint travel along a different path than communications from the second endpoint. If the first endpoint was to send a trace route it would follow the path used by its communications and might miss the component or area that was causing the impairment in the path used by communications from the second endpoint.

As alluded to above with respect to step 310, the way in which the first endpoint sends its request to the second endpoint may depend on the protocol or features that have been negotiated between the two endpoints. More specifically, if the endpoints have agreed to periodically send RTCP-XR or RTCP-HR reports to one another then the next report sent from the first endpoint, after the impaired communication was detected by the first endpoint, may contain metric information pertaining to the impairment. The second endpoint may receive the metric information in the RTCP-XR or RTCP-HR report and, upon analyzing it, determine that at least one of its communications have become impaired and, at step 340, it may then send a trace route along the communication path from the second endpoint to the first endpoint.

A second possible way in which the second endpoint may be alerted to the fact that the first endpoint has received an impaired communication from the second endpoint and that the second endpoint should initiate a trace route may be for the first endpoint to initiate its own RTP no-op packet based trace route with a request early feedback flag set. When the second endpoint receives the trace route message with the request early feedback flag set, the second endpoint may interpret the message as a notification that the first endpoint has received an impaired communication and that the second endpoint should initiate a trace route along the path to the first endpoint. Then, at step 340, the second endpoint may initiate the trace route along the path to the first endpoint.

A third possible way in which the first endpoint may request a remote trace route from the second endpoint may be for the first endpoint to send an NSE message to the second endpoint. In order for the NSE message to function properly as a remote trace route request it may, in some embodiments, be necessary for the endpoints to negotiate during call establishment the use of NSE messages and the value to be used in the event number field to indicate when an impaired communication has been detected. Once the second endpoint receives the NSE message from the first endpoint with the proper value in the event number field, the second endpoint may, at step 340, initiate a trace route.

A fourth possible way in which the first endpoint may cause the second endpoint to initiate a remote trace route may be for the first endpoint to set a request trace route flag in either a binding request or as part of a STUN trace route. The request trace route flag notifies the second endpoint that the first endpoint has detected an impairment in a communication sent from the second endpoint. Upon receiving the notification with the request trace route flag set, the second endpoint may, at step 340, initiate a trace route.

Where the endpoints have negotiated protocols and features during call establishment that provide for multiple ways of requesting a remote trace route, the request that is used may depend on the configuration of the first endpoint. For example, the first endpoint may be configured such that each type of request has a priority associated therewith, and when it is time to make the request the first endpoint may select the type of request (from among the types of requests upon which the two endpoints have successfully negotiated) with the highest priority. Furthermore, the second endpoint may be able to ignore a remote trace route request sent from the first endpoint. For example, the second endpoint may be configured to wait a certain amount of time between trace routes. Thus it may ignore a remote trace route request received from the first endpoint if the request is received within that certain amount of time of the second endpoint having initiated a trace route.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments include methods and systems that enable a local endpoint to request, or otherwise trigger, a remote trace route initiated by a remote endpoint. This allows the trace route to follow the path used by the impaired communication. The type of request that is used may depend on the protocol and/or features that are successfully negotiated between the endpoints during call establishment, as well as how the endpoints have been configured (e.g., the priority associated with different types of requests).

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and endpoints 72, any of these elements may be combined, removed, altered, rearranged or positioned in order to accommodate particular routing architectures or needs. In addition, any of these elements may be provided as separate external components to communication system 30, endpoints 72, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for initiating a remote trace route, comprising:
    establishing a communication session between a first endpoint and a second endpoint;
    negotiating, during communication session establishment, at least one protocol, at least one feature, and a plurality of different types of remote trace route requests for use during the communication session;
    determining a type of trace route request from the plurality of different types of remote trace route requests to use to request a remote trace route based on the at least one protocol and the at least one feature negotiated during communication session establishment;
    detecting at the first endpoint a quality impairment in a communication sent from the second endpoint;
    in response to detecting the quality impairment at the first endpoint, sending a request from the first endpoint to the second endpoint for the second endpoint to initiate a trace route from the second endpoint to the first endpoint, wherein the request is based on the determined type of request; and
    upon receiving the request at the second endpoint, initiating a trace route from the second endpoint to the first endpoint.

2. The method of claim 1, wherein sending a request from the first endpoint to the second endpoint for the second endpoint to initiate a trace route from the second endpoint to the first endpoint comprises sending a real-time transport protocol (RTP) no-op packet based trace route from the first endpoint to the second endpoint, wherein the RTP no-op packet based trace route alerts the second endpoint that the first endpoint has detected the quality impairment and requests the second endpoint to initiate a trace route.

3. The method of claim 2, further comprising setting a request early feedback flag in the RTP no-op packet based trace route.

4. The method of claim 1, wherein sending a request from the first endpoint to the second endpoint for the second endpoint to initiate a trace route from the second endpoint to the first endpoint comprises sending a named signaling event (NSE) message from the first endpoint to the second endpoint alerting the second endpoint that the first endpoint has detected the quality impairment and requesting the second endpoint to initiate a trace route, the NSE message comprising a value in an event number field of the NSE message, the value assigned to indicate that the first endpoint has detected the quality impairment in the communication sent from the second endpoint.

5. The method of claim 1, wherein sending a request from the first endpoint to the second endpoint for the second endpoint to initiate a trace route from the second endpoint to the first endpoint comprises sending a simple traversal of user datagram protocol (UDP) through network address translators (NATs) (STUN) protocol binding request from the first endpoint to the second endpoint, the STUN binding request alerting the second endpoint that the first endpoint has detected a quality impairment and requesting the second endpoint to initiate a trace route.

6. A system for initiating a remote trace route, comprising:
at least two processors operable to:
establish a communication session between a first endpoint and a second endpoint; and
negotiate, during communication session establishment, at least one protocol, at least one feature, and a plurality of different types of remote trace route requests for use during the communication session;
a first processor of the at least two processors operable to:
detect at the first endpoint a quality impairment in a communication sent from the second endpoint;
determine a type of trace route request from the plurality of different types of remote trace route requests to use to request a remote trace route based on the at least one protocol and the at least one feature negotiated during communication session establishment;
an interface coupled to the first processor and operable to, in response to detecting the quality impairment at the first endpoint, send a request from the first endpoint to the second endpoint for the second endpoint to initiate a trace route from the second endpoint to the first endpoint, wherein the request is based on the determined type of request; and
a second processor of the at least two processors operable to, upon receiving the request at the second endpoint, initiate a trace route from the second endpoint to the first endpoint.

7. The system of claim 6, wherein the interface operable to send a request from the first endpoint to the second endpoint for the second endpoint to initiate a trace route from the second endpoint to the first endpoint comprises an interface operable to send a real-time transport protocol (RTP) no-op packet based trace route from the first endpoint to the second endpoint, wherein the RTP no-op packet based trace route alerts the second endpoint that the first endpoint has detected the quality impairment and requests the second endpoint to initiate a trace route.

8. The system of claim 7, wherein the first processor is further operable to set a request early feedback flag in the RTP no-op packet based trace route.

9. The system of claim 6, wherein the interface operable to send a request from the first endpoint to the second endpoint for the second endpoint to initiate a trace route from the second endpoint to the first endpoint comprises an interface operable to send a named signaling event (NSE) message from the first endpoint to the second endpoint alerting the second endpoint that the first endpoint has detected the quality impairment and requesting the second endpoint to initiate a trace route, the NSE message comprising a value in an event number field of the NSE message, the value is assigned to indicate that the first endpoint has detected the quality impairment in the communication sent from the second endpoint.

10. The system of claim 6, wherein the interface operable to send a request from the first endpoint to the second endpoint for the second endpoint to initiate a trace route from the second endpoint to the first endpoint comprises an interface operable to send a simple traversal of user datagram protocol (UDP) through network address translators (NATs) (STUN) protocol binding request from the first endpoint to the second endpoint, the STUN binding request alerting the second endpoint that the first endpoint has detected a quality impairment and requesting the second endpoint to initiate a trace route.

11. Logic embodied in a computer readable medium, the computer readable medium comprising code operable to:
establish a communication session between a first endpoint and a second endpoint;
negotiate, during communication session establishment, at least one protocol, at least one feature, and a plurality of different types of remote trace route requests for use during the communication session;
determine a type of trace route request from the plurality of different types of remote trace route requests to use to request a remote trace route based on the at least one protocol and the at least one feature negotiated during communication session establishment;
detect at the first endpoint a quality impairment in a communication sent from the second endpoint;
in response to detecting the quality impairment at the first endpoint, send a request from the first endpoint to the second endpoint for the second endpoint to initiate a trace route from the second endpoint to the first endpoint, wherein the request is based on the determined type of request; and
upon receiving the request at the second endpoint, initiate a trace route from the second endpoint to the first endpoint.

12. The medium of claim 11, wherein the code operable to send a request from the first endpoint to the second endpoint for the second endpoint to initiate a trace route from the second endpoint to the first endpoint comprises code operable to send a real-time transport protocol (RTP) no-op packet based trace route from the first endpoint to the second endpoint, wherein the RTP no-op packet based trace route alerts the second endpoint that the first endpoint has detected the quality impairment and requests the second endpoint to initiate a trace route.

13. The medium of claim 12, wherein the code is further operable to set a request early feedback flag in the RTP no-op packet based trace route.

14. The medium of claim 11, wherein the code operable to send a request from the first endpoint to the second endpoint for the second endpoint to initiate a trace route from the second endpoint to the first endpoint comprises code operable to send a named signaling event (NSE) message from the first endpoint to the second endpoint alerting the second endpoint that the first endpoint has detected the quality impairment and requesting the second endpoint to initiate a trace route, the NSE message comprising a value in an event number field of the NSE message, the value is assigned to indicate that the first endpoint has detected the quality impairment in the communication sent from the second endpoint.

15. The medium of claim 11, wherein the code operable to send a request from the first endpoint to the second endpoint for the second endpoint to initiate a trace route from the second endpoint to the first endpoint comprises code operable to send a simple traversal of user datagram protocol (UDP) through network address translators (NATs) (STUN) protocol binding request from the first endpoint to the second endpoint, the STUN binding request alerting the second endpoint that the first endpoint has detected a quality impairment and requesting the second endpoint to initiate a trace route.

16. A system for initiating a remote trace route, comprising:
   means for establishing a communication session between a first endpoint and a second endpoint;
   means for negotiating, during communication session establishment, at least one protocol, at least one feature, and a plurality of different types of remote trace route requests for use during the communication session;
   means for determining a type of trace route request from the plurality of different types of remote trace route requests to use to request a remote trace route based on the at least one protocol and the at least one feature negotiated during communication session establishment;
   means for detecting at the first endpoint a quality impairment in a communication sent from the second endpoint;
   means for, in response to detecting the quality impairment at the first endpoint, sending a request from the first endpoint to the second endpoint for the second endpoint to initiate a trace route from the second endpoint to the first endpoint, wherein the request is based on the determined type of request; and
   means for, upon receiving the request at the second endpoint, initiating a trace route from the second endpoint to the first endpoint.

17. A method for initiating a remote trace route, comprising:
   establishing a communication session with a first endpoint;
   negotiating, during communication session establishment, at least one protocol, at least one feature, and a plurality of different types of remote trace route requests for use during the communication session;
   determining a type of trace route request from the plurality of different types of remote trace route requests to use to request a remote trace route based on the at least one protocol and the at least one feature negotiated during communication session establishment;
   periodically receiving a metric report from the first endpoint, the metric report comprising information about the quality of a communication sent from a second endpoint;
   analyzing the metric report sent from the first endpoint to determine if the communication sent from the second endpoint was quality impaired; and
   initiating a trace route from the second endpoint to the first endpoint upon determining that the communication sent from the second endpoint was quality impaired.

18. The method of claim 17, wherein establishing a communication session with a first endpoint comprises negotiating a remote metric support reporting capability selected from the group consisting of real-time transport control protocol extended report (RTCP-XR) and real-time transport control protocol high-resolution report (RTCP-HR).

19. A system for initiating a remote trace route, comprising:
   a processor operable to:
   establish a communication session with a first endpoint;
   negotiate, during communication session establishment, at least one protocol, at least one feature, and a plurality of different types of remote trace route requests for use during the communication session;
   determine a type of trace route request from the plurality of different types of remote trace route requests to use to request a remote trace route based on the at least one protocol and the at least one feature negotiated during communication session establishment; and
   an interface coupled to the processor and operable to periodically receive a metric report from the first endpoint, the metric report comprising information about the quality of a communication sent from a second endpoint;
   wherein the processor is further operable to:
   analyze the metric report sent from the first endpoint to determine if the communication sent from the second endpoint was quality impaired; and
   initiate a trace route from the second endpoint to the first endpoint upon determining that the communication sent from the second endpoint was quality impaired.

20. The system of claim 19, wherein the processor operable to establish a communication session with a first endpoint comprises a processor operable to negotiate a remote metric support reporting capability selected from the group consisting of real-time transport control protocol extended report (RTCP-XR) and real-time transport control protocol high-resolution report (RTCP-HR).

21. Logic embodied in a computer readable medium, the computer readable medium comprising code operable to:
   establish a communication session with a first endpoint;
   negotiate, during communication session establishment, at least one protocol, at least one feature, and a plurality of different types of remote trace route requests for use during the communication session;
   determine a type of trace route request from the plurality of different types of remote trace route requests to use to request a remote trace route based on the at least one protocol and the at least one feature negotiated during communication session establishment;
   periodically receive a metric report from the first endpoint, the metric report comprising information about the quality of a communication sent from a second endpoint;
   analyze the metric report sent from the first endpoint to determine if the communication sent from the second endpoint was quality impaired; and
   initiate a trace route from the second endpoint to the first endpoint upon determining that the communication sent from the second endpoint was quality impaired.

22. The medium of claim 21, wherein the code operable to establish a communication session with a first endpoint comprises code operable to negotiate a remote metric support reporting capability selected from the group consisting of real-time transport control protocol extended report (RTCP-XR) and real-time transport control protocol high-resolution report (RTCP-HR).

23. A method for initiating a remote trace route, comprising:
   establishing a communication session with a second endpoint;

negotiating, during communication session establishment, at least one protocol, at least one feature, and a plurality of different types of remote trace route requests for use during the communication session;

determining a type of trace route request from the plurality of different types of remote trace route requests to use to request a remote trace route based on the at least one protocol and the at least one feature negotiated during communication session establishment;

detecting a quality impairment in a communication sent from the second endpoint; and in response to detecting the quality impairment, sending a request to the second endpoint for the second endpoint to initiate a trace route from the second endpoint to the first endpoint, the request triggering the trace route from the second endpoint to a first endpoint, wherein the request is based on the determined type of request.

24. The method of claim 23, wherein sending a request to the second endpoint for the second endpoint to initiate a trace route from the second endpoint to the first endpoint comprises sending a real-time transport protocol (RTP) no-op packet based trace route to the second endpoint, wherein the RTP no-op packet based trace route alerts the second endpoint that the first endpoint has detected the quality impairment and requests the second endpoint to initiate a trace route.

25. The method of claim 24, further comprising setting a request early feedback flag in the RTP no-op packet based trace route.

26. The method of claim 23, wherein sending a request to the second endpoint for the second endpoint to initiate a trace route from the second endpoint to the first endpoint comprises sending a named signaling event (NSE) message to the second endpoint alerting the second endpoint that the first endpoint has detected the quality impairment and requesting the second endpoint to initiate a trace route, the NSE message comprising a value in an event number field of the NSE message, the value assigned to indicate that the first endpoint has detected the quality impairment in the communication sent from the second endpoint.

27. The method of claim 23, wherein sending a request to the second endpoint for the second endpoint to initiate a trace route from the second endpoint to the first endpoint comprises sending a simple traversal of user datagram protocol (UDP) through network address translators (NATs) (STUN) protocol binding request to the second endpoint, the STUN binding request alerting the second endpoint that the first endpoint has detected a quality impairment and requesting the second endpoint to initiate a trace route.

28. A method for initiating a remote trace route, comprising:

establishing a communication session with a first endpoint;

negotiating, during communication session establishment, at least one protocol, at least one feature, and a plurality of different types of remote trace route requests for use during the communication session;

determining a type of trace route request from the plurality of different types of remote trace route requests to use to request a remote trace route based on the at least one protocol and the at least one feature negotiated during communication session establishment;

transmitting a communication to the first endpoint, the communication arriving at the first endpoint with a quality impairment;

receiving a request from the first endpoint to initiate a trace route towards the first endpoint in response to detection of the quality impairment, wherein the request is based on the determined type of request; and initiating a trace route towards the first endpoint.

29. The method of claim 1, wherein determining a type of request to use to request a remote trace route comprises:

identifying more than one type of trace route that can be used for the remote trace route;

selecting, from among the more than one type of trace route only one type of trace route to use for the remote trace route; and determining the type of request to use to request the remote trace route based on the selected type of trace route to use for the remote trace route and the at least one protocol and the at least one feature negotiated during communication session establishment.

30. The system of claim 6, wherein the first processor operable to determine a type of request to use to request a remote trace route is further operable to:

identify more than one type of trace route that can be used for the remote trace route;

select, from among the more than one type of trace route only one type of trace route to use for the remote trace route; and determine the type of request to use to request the remote trace route based on the selected type of trace route to use for the remote trace route and the at least one protocol and the at least one feature negotiated during communication session establishment.

31. The medium of claim 11, wherein the code operable to determine a type of request to use to request a remote trace route comprises code operable to:

identify more than one type of trace route that can be used for the remote trace route;

select, from among the more than one type of trace route only one type of trace route to use for the remote trace route; and determine the type of request to use to request the remote trace route based on the selected type of trace route to use for the remote trace route and the at least one protocol and the at least one feature negotiated during communication session establishment.

* * * * *